US008990653B2

(12) United States Patent
Chiabrera

(10) Patent No.: US 8,990,653 B2
(45) Date of Patent: Mar. 24, 2015

(54) APPARATUS AND METHOD FOR TRANSMITTING AND RECOVERING ENCODED DATA STREAMS ACROSS MULTIPLE PHYSICAL MEDIUM ATTACHMENTS

(75) Inventor: Michele Chiabrera, Ottawa (CA)

(73) Assignee: STMicroelectronics, Inc., Coppell, TX (US)

( * ) Notice: Subject to any disclaimer, the term of this patent is extended or adjusted under 35 U.S.C. 154(b) by 2369 days.

(21) Appl. No.: 11/396,056

(22) Filed: Mar. 31, 2006

(65) Prior Publication Data

US 2007/0234172 A1    Oct. 4, 2007

(51) Int. Cl.
*H03M 13/00* (2006.01)
*G06F 11/00* (2006.01)
*G08C 25/00* (2006.01)
*H04L 1/00* (2006.01)

(52) U.S. Cl.
CPC ............ *H04L 1/0078* (2013.01); *H04L 1/0043* (2013.01); *H04L 1/0045* (2013.01)
USPC .......................................... 714/752; 714/799

(58) Field of Classification Search
CPC ............... H04L 25/03866; H04L 25/4908; H04L 1/0078; H04L 1/0041; H04L 1/0057; H03M 13/05; H03M 13/33
USPC ......... 714/712, 715, 707, 798, 799, 821, 701, 714/776, 752, 786; 370/473, 536, 510; 341/95, 58

See application file for complete search history.

(56) References Cited

U.S. PATENT DOCUMENTS

| | | | | |
|---|---|---|---|---|
| 4,849,929 A | * | 7/1989 | Timsit | 714/5.1 |
| RE34,100 E | * | 10/1992 | Hartness | 714/769 |
| 6,630,638 B1 | * | 10/2003 | Freeman et al. | 200/50.21 |
| 7,020,729 B2 | * | 3/2006 | Taborek et al. | 710/305 |
| 7,055,073 B2 | * | 5/2006 | Walker et al. | 714/701 |
| 7,200,799 B2 | * | 4/2007 | Wang et al. | 714/795 |
| 7,251,699 B1 | * | 7/2007 | Lo | 709/250 |
| 7,274,315 B2 | * | 9/2007 | Baumer | 341/95 |
| 7,343,540 B2 | * | 3/2008 | Khermosh et al. | 714/758 |
| 7,490,282 B2 | * | 2/2009 | Spencer et al. | 714/755 |
| 7,528,747 B2 | * | 5/2009 | Baumer | 341/95 |
| 7,859,437 B2 | * | 12/2010 | Baumer | 341/95 |
| 7,873,892 B2 | * | 1/2011 | Ganga et al. | 714/752 |
| 8,553,785 B2 | * | 10/2013 | Chiabrera | 375/253 |
| 2003/0053493 A1 | * | 3/2003 | Graham Mobley et al. | 370/538 |
| 2008/0104485 A1 | * | 5/2008 | Lyakh et al. | 714/776 |
| 2014/0019827 A1 | * | 1/2014 | Ganga et al. | 714/776 |

* cited by examiner

*Primary Examiner* — Phung M Chung
(74) *Attorney, Agent, or Firm* — Allen, Dyer, Doppelt, Milbrath & Gilchrist, P.A.

(57) ABSTRACT

A method includes generating an encoded data block, dividing the encoded data block into a plurality of sub-blocks, and transmitting the plurality of sub-blocks over a plurality of physical medium attachments. The encoded data block may be generated using 64B/66B encoding, and the data being encoded could first be decoded using 8B/10B decoding. Another method includes receiving a plurality of sub-blocks over a plurality of physical medium attachments, generating an encoded data block using the plurality of sub-blocks, and recovering data encoded in the encoded data block. The data may be recovered from the encoded data block using 64B/66B decoding, and the recovered data may be subsequently encoded using 8B/10B encoding. Each physical medium attachment may be capable of serializing data for transmission over a physical transmission medium (such as printed circuit board tracks or lanes) and deserializing data received over the physical transmission medium.

14 Claims, 10 Drawing Sheets

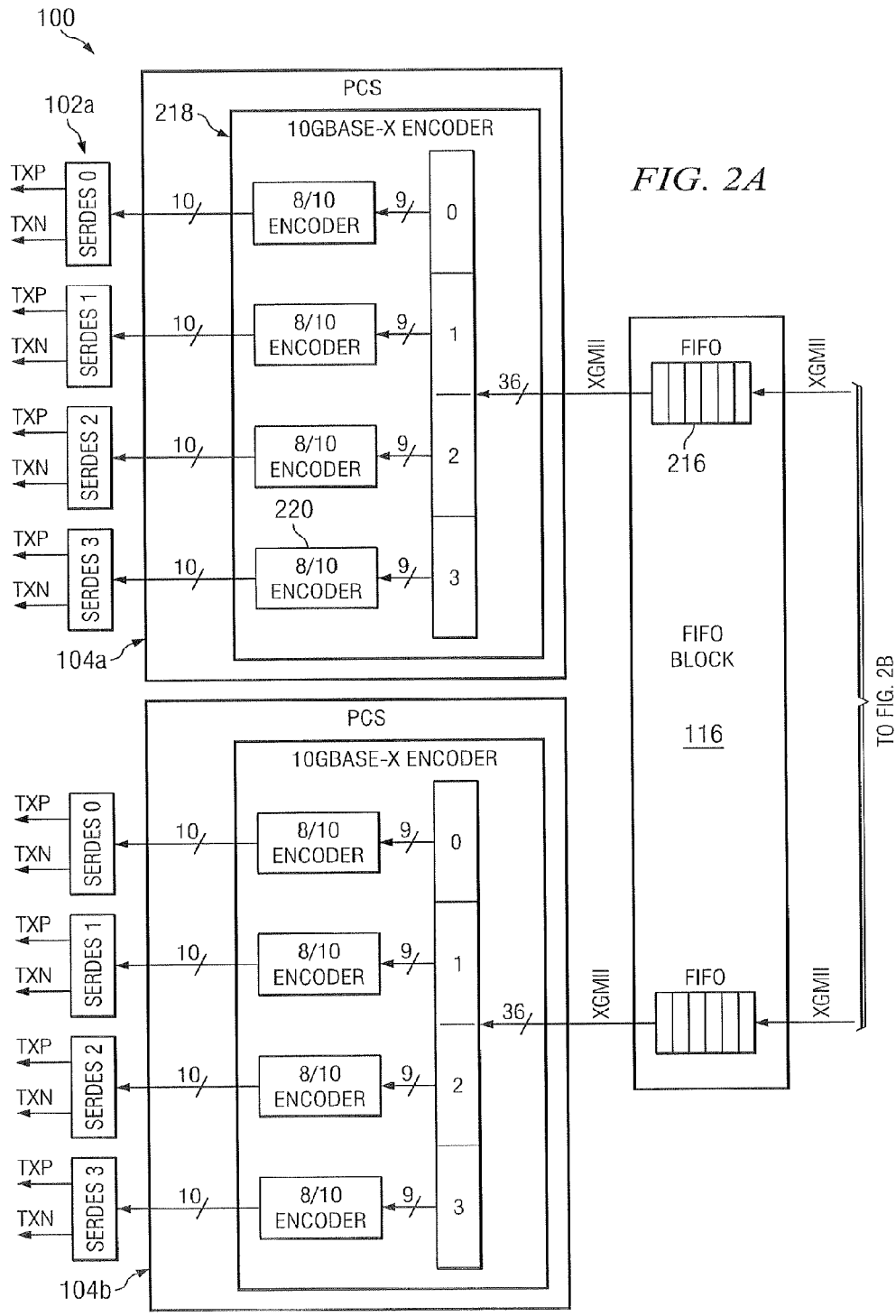

700

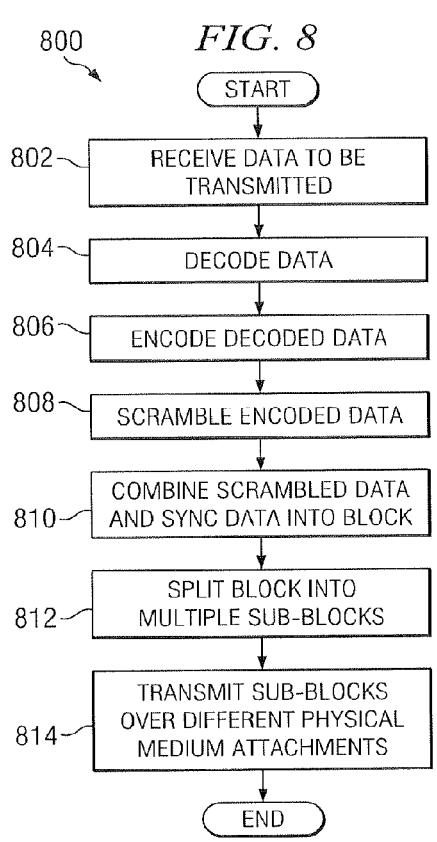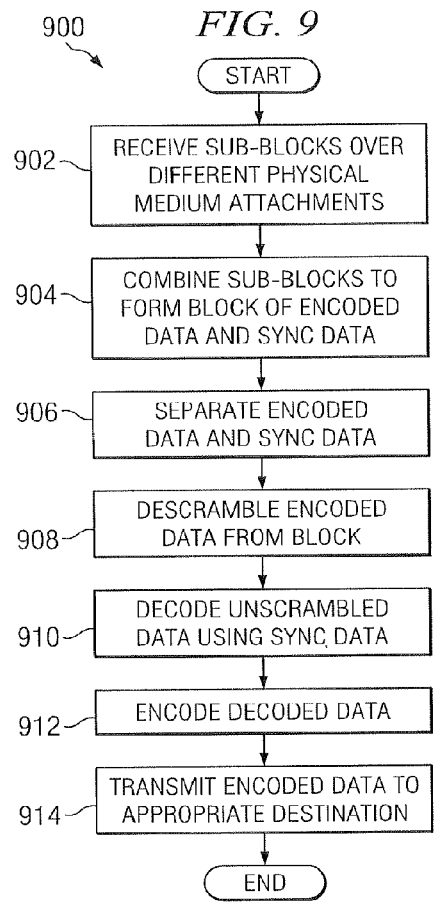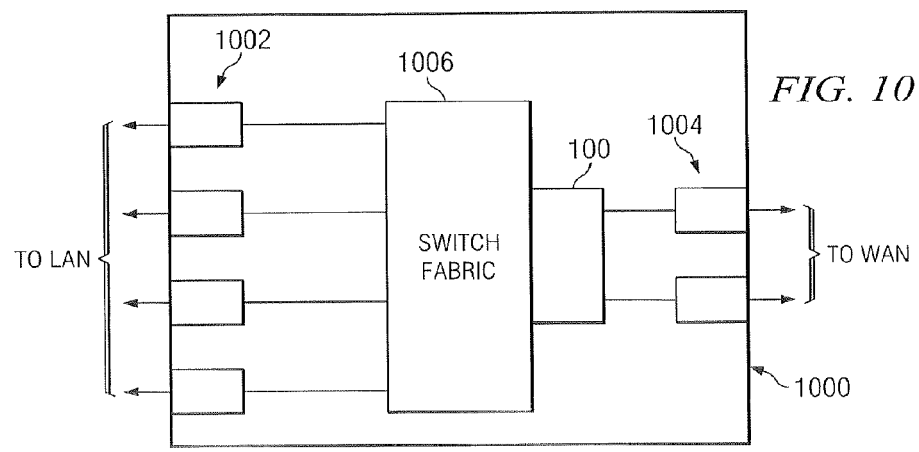

APPARATUS AND METHOD FOR TRANSMITTING AND RECOVERING ENCODED DATA STREAMS ACROSS MULTIPLE PHYSICAL MEDIUM ATTACHMENTS

TECHNICAL FIELD

This disclosure is generally directed to communication networks and more specifically to an apparatus and method for transmitting and recovering encoded data streams across multiple physical medium attachments.

BACKGROUND

The communication of data over communication networks often involves encoding and decoding the data. Many different coding schemes have been developed for use in encoding and decoding data. One conventional coding scheme is 64B/66B coding, which is defined in the IEEE 802.3 standard for use in networks like ten-gigabit Ethernet networks. The 64B/66B coding scheme is used for physical coding sublayer (PCS) encoding and decoding of data.

In the 64B/66B coding scheme, eight ten-gigabit media independent interface (XGMII) octets are encoded into a 66-bit encoded data block, which is transferred over a single physical medium attachment in 16-bit transfers. Similarly, eight XGMII octets are decoded from a 66-bit encoded data block, which is received over a single physical medium attachment in 16-bit transfers. A physical medium attachment typically supports access to a physical transmission medium, such as printed circuit board (PCB) tracks or lanes. The physical medium attachment may be responsible, for example, for serializing and deserializing data between the physical transmission medium and the physical coding sublayer.

SUMMARY

This disclosure provides an apparatus and method for transmitting and recovering encoded data streams across multiple physical medium attachments.

In a first embodiment, a method includes generating an encoded data block, dividing the encoded data block into a plurality of sub-blocks, and transmitting the plurality of sub-blocks over a plurality of physical medium attachments. In particular embodiments, the encoded data block is generated using 64B/66B encoding, and the data being encoded is first decoded using 8B/10B decoding.

In a second embodiment, a method includes receiving a plurality of sub-blocks over a plurality of physical medium attachments, generating an encoded data block using the plurality of sub-blocks, and recovering data encoded in the encoded data block. In particular embodiments, the data is recovered from the encoded data block using 64B/66B decoding, and the recovered data is subsequently encoded using 8B/10B encoding.

In a third embodiment, an apparatus includes at least one of (i) a transmitter capable of generating a first encoded data block, dividing the first encoded data block into a plurality of first sub-blocks, and transmitting the plurality of first sub-blocks over a plurality of physical medium attachments, and (ii) a receiver capable of receiving a plurality of second sub-blocks over the plurality of physical medium attachments, generating a second encoded data block using the plurality of second sub-blocks, and recovering data encoded in the second encoded data block. In particular embodiments, the apparatus includes both the transmitter and the receiver. In other particular embodiments, the apparatus further includes (i) a decoder capable of receiving and decoding 8B/10B encoded data to produce decoded data, where the first encoded data block is generated using the decoded data, and (ii) an encoder capable of receiving the recovered data from the receiver and 8B/10B encoding the data for transmission.

In a fourth embodiment, a computer program is embodied on a computer readable medium and is capable of being executed by a processor. The computer program includes computer readable program code for at least one of (i) generating a first encoded data block, dividing the first encoded data block into a plurality of first sub-blocks, and transmitting the plurality of first sub-blocks over a plurality of physical medium attachments, and (ii) receiving a plurality of second sub-blocks over the plurality of physical medium attachments, generating a second encoded data block using the plurality of second sub-blocks, and recovering data encoded in the second encoded data block.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 1A through 2B illustrate an example device for transmitting and recovering encoded data streams across multiple physical medium attachments according to one embodiment of this disclosure Conditional;

FIG. 8 illustrates an example method for transmitting an encoded data stream across multiple physical medium attachments according to one embodiment of this disclosure;

FIG. 9 illustrates an example method for receiving an encoded data stream across multiple physical medium attachments according to one embodiment of this disclosure; and FIG. 10 illustrates an example apparatus implementing the device of FIGS. 1A, 1B, 2A and 2B according to one embodiment of this disclosure.

DETAILED DESCRIPTION

Figure 1A:
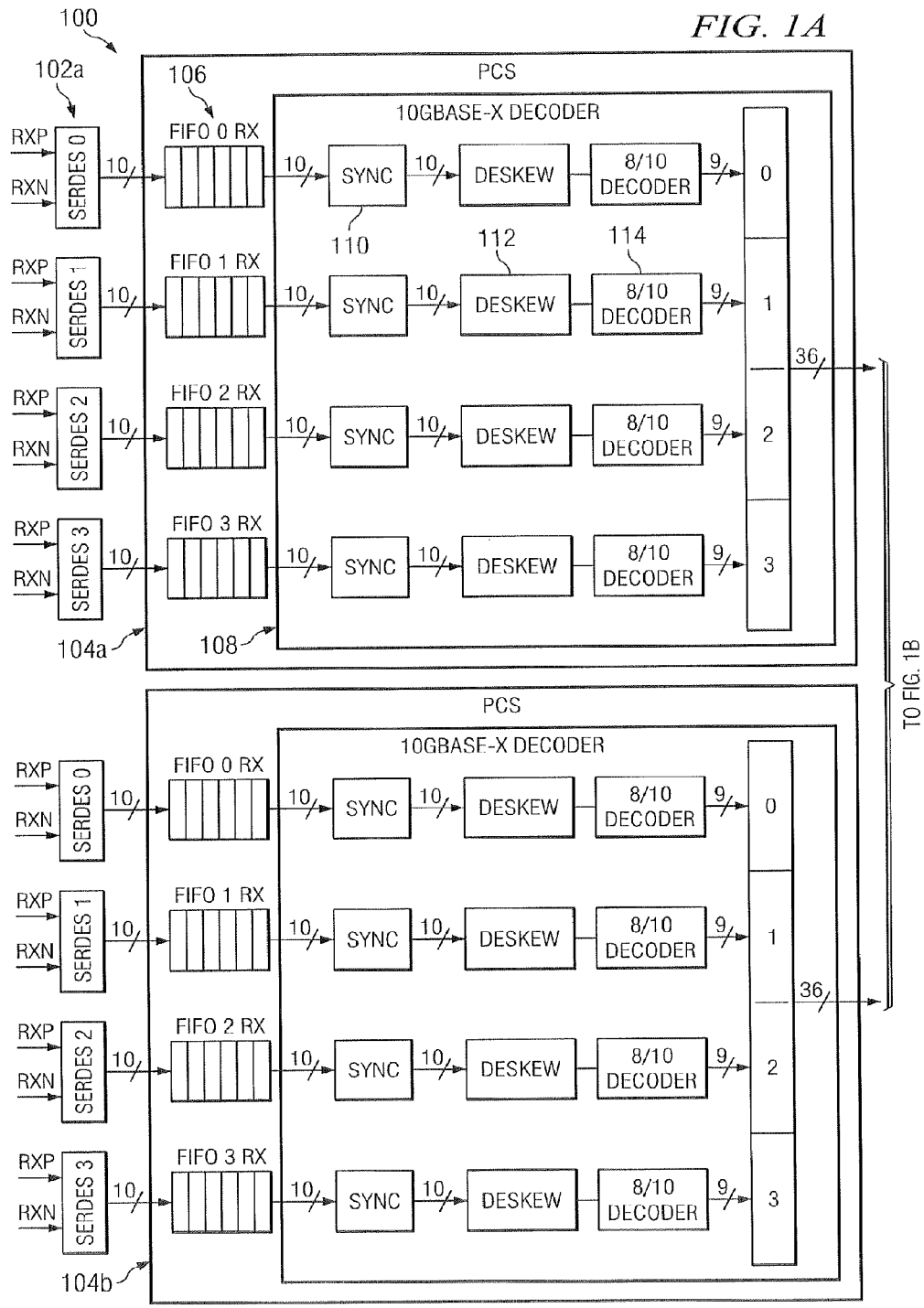
Figure 1B:
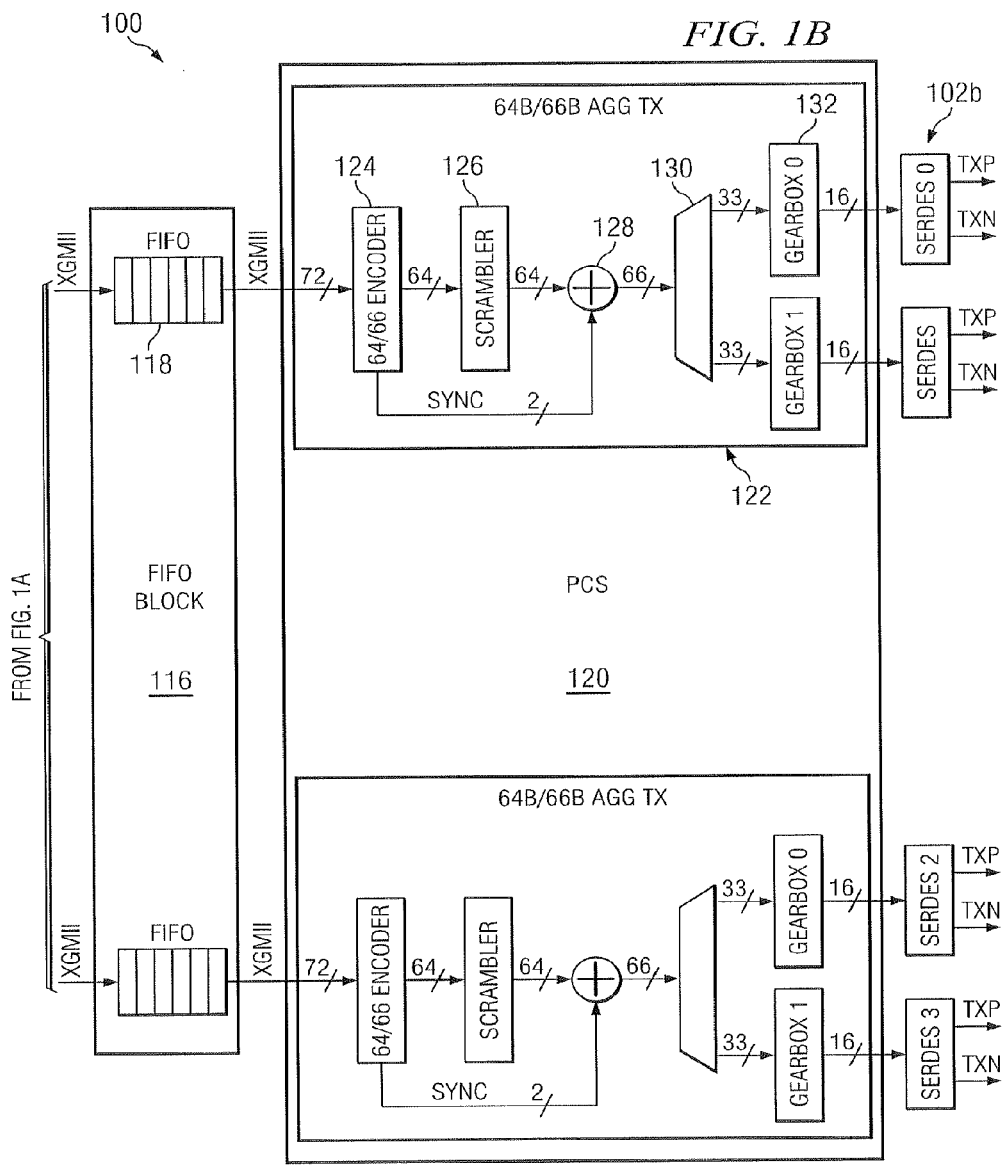
Figure 2B:
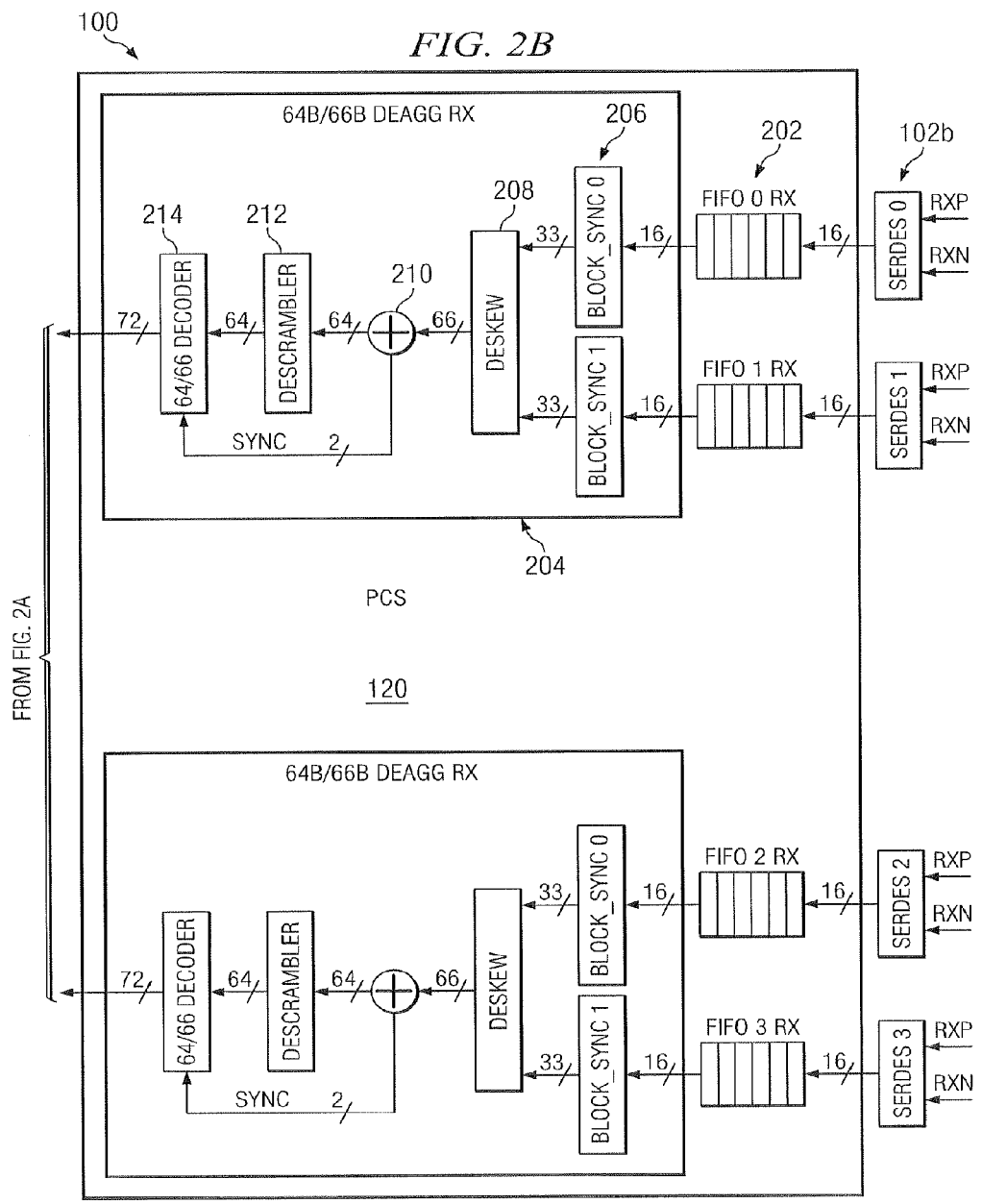

FIGS. 1A through 2B illustrate an example device 100 for transmitting and recovering encoded data streams across multiple physical medium attachments according to one embodiment of this disclosure. In particular, FIGS. 1A and 1B illustrate the device 100 configured to aggregate data into a 64B/66B encoded data stream for transmission across multiple physical medium attachments, and FIGS. 2A and 2B illustrate the device 100 configured to deaggregate a 64B/66B encoded data stream received across multiple physical medium attachments. The embodiment of the device 100 shown in FIGS. 1A through 2B is for illustration only. Other embodiments may be used without departing from the scope of this disclosure.

In one aspect of operation, the device 100 transmits and recovers encoded data streams across multiple physical medium attachments. For example, the device 100 could receive 8B/10B encoded data, decode the data, encode the data as 64B/66B encoded data, and transmit the 64B/66B encoded data using multiple physical medium attachments. Similarly, the device 100 could receive 64B/66B encoded data using multiple physical medium attachments, decode the data, encode the data as 8B/10B encoded data, and transmit the 8B/10B encoded data. In this way, the device 100 may transmit and receive data using a larger number of physical medium attachments.

As shown in FIGS. 1A and 1B, the device 100 includes multiple serializers/deserializers (SERDES) 102a-102b. The serializers/deserializers 102a-102b are capable of converting parallel data into serial format and converting serial data into parallel format. In this configuration, each of the serializers/deserializers 102a is used to deserialize a serial differential signal that is received over two signal lines denoted RXP and RXN. Similarly, each of the serializers/deserializers 102b is used to serialize parallel data into a serial differential signal that is transmitted over two signal lines denoted TXP and TXN. Each of the serializers/deserializers 102a-102b includes any hardware, software, firmware, or combination thereof for serializaing and/or deserializing data.

Each of the serializers/deserializers 102a-102b may represent a physical medium attachment. A physical medium attachment provides access to a physical connection, such as printed circuit board (PCB) tracks or lanes. In these embodiments, each of the serializers/deserializers 102a-102b may include a connector for coupling to a transmission medium.

Two physical coding sublayer (PCS) modules 104a-104b decode encoded data that is received via the serializers/deserializers 102a and provide the decoded data for further processing. In this example, each of the PCS modules 104a-104b includes a first-in, first-out (FIFO) queue 106 for each serializer/deserializer 102a coupled to that PCS module. Each queue 106 stores the deserialized data output by one of the serializers/deserializers 102a and facilitates retrieval of the deserialized data by other components of the PCS modules 104a-104b. Each queue 106 represents any suitable structure for storing and facilitating retrieval of information.

Each of the PCS modules 104a-104b also includes a ten-gigabit base-X (10GBase-X) decoder 108. The 10GBase-X decoder 108 is capable of decoding the deserialized data retrieved from the queues 106. For example, the deserialized data could have been encoded using 8B/10B encoding, and the 10GBase-X decoder 108 could implement the necessary functions to decode and recover the data. The 10GBase-X decoder 108 includes any hardware, software, firmware, or combination thereof for decoding data.

In this example, the 10GBase-X decoder 108 includes multiple lanes (denoted "0" through "3") each associated with a synchronization module 110, a deskew module 112, and an 8B/10B decoder 114. The synchronization module 110 performs synchronization operations needed to synchronize with the serialized data for that lane, such as by performing comma detection according to Clause 48.2.6.2.2 of the IEEE 802.3 standard. The deskew module 112 performs deskewing operations, such as lane alignment, according to Clause 48.2.6.2.3 of the IEEE 802.3 standard. The 8B/10B decoder 114 performs decoding operations to decode data previously encoded using the 8B/10B encoding scheme. The outputs of the four lanes combine to form a single output of that PCS module. Each of the components in the 10GBase-X decoder 108 may include any hardware, software, firmware, or combination thereof for performing the appropriate functions. Also, the IEEE 802.3 and 802.3ae standards are hereby incorporated by reference.

The outputs from the two PCS modules 104a-104b are stored in a FIFO block 116, which includes a FIFO queue 118 for each of the PCS modules 104a-104b. Each queue 118 represents any suitable structure for storing and facilitating retrieval of data output by one of the PCS modules 104a-104b.

A PCS module 120 is coupled to the FIFO block 116. The PCS module 120 is capable of encoding data stored in the FIFO block 116 and transmitting the encoded data over multiple physical medium attachments. In this example, the PCS module 120 includes two 64B/66B aggregate transmitters 122. Each transmitter 122 is capable of generating and communicating a 64B/66B encoded data stream across multiple physical medium attachments (in this case, two physical medium attachments represented by two serializers/deserializers 102b). Each transmitter 122 includes any hardware, software, firmware, or combination thereof for transmitting encoded data over multiple physical medium attachments.

In this example, each transmitter 122 includes a 64B/66B encoder 124, a scrambler 126, a combiner 128, a demultiplexer 130, and two gearboxes 132. The 64B/66B encoder 124 is capable of receiving data from one of the FIFO queues 118 and encoding the data using 64B/66B coding. For example, the 64B/66B encoder 124 may output 64 bits of encoded data and two bits of synchronization data (data used to synchronize with the blocks in a stream). The scrambler 126 receives and scrambles the 64 bits of encoded data, such as by implementing a specified or known scrambling technique that can be reversed at a receiver. As a particular example, the scrambler 126 could operate according to Clause 49.2.6 of the IEEE 802.3 standard. The combiner 128 receives and combines the 64 bits of scrambled data with the two bits of synchronization data to form a 66-bit encoded data block. The demultiplexer 130 divides the 66-bit encoded data block into two 33-bit sub-blocks. Each gearbox 132 is responsible for adapting one of the 33-bit sub-blocks into 16-bit transfers. Each of the components in the transmitters 122 may include any hardware, software, firmware, or combination thereof for performing the appropriate functions.

In this example embodiment, the 10GBase-X decoder 108 receives 10-bit transmission characters, and each decoder 114 decodes the transmission characters to produce 9-bit data values (each with an 8-bit payload and a 1-bit control or header). The 9-bit data values from the four decoders 114 in a single PCS module 104a or 104b combine to form a 36-bit data value, which is stored in the appropriate queue 118. Two 36-bit data values (for a total of 72 bits) are retrieved from a queue 118 by the corresponding transmitter 122. The 72 bits contain eight 8-bit payloads, which are encoded by the 64B/66B encoder 124 as 64 bits of encoded data. The encoded data is then further processed as described above and transmitted over multiple physical medium attachments.

As shown in FIGS. 2A and 2B, the device 100 is also capable of receiving an encoded data stream over multiple physical medium attachments and recovering the data from the data stream. In this example, the PCS module 120 further includes multiple FIFO queues 202 and two 64B/66B aggregate receivers 204. In this example, each of the serializers/deserializers 102b may serialize incoming data that forms part of an incoming encoded data stream. Each queue 202 stores the serialized data output by one of the serializers/deserializers 102b and facilitates retrieval of the data by the receivers 204. Each queue 202 represents any suitable structure for storing and facilitating retrieval of information.

Each receiver 204 is capable of receiving a 64B/66B encoded data stream across multiple physical medium attachments (in this case, two physical medium attachments represented by two serializers/deserializers 102b). Each receiver 204 includes any hardware, software, firmware, or combination thereof for receiving encoded data over multiple physical medium attachments.

In this example, each receiver 204 includes two block synchronization modules 206, a deskew module 208, a separator 210, a descrambler 212, and a 64B/66B decoder 214. Each block synchronization module 206 is responsible for adapting 16-bit inputs (the 16-bit transfers from a transmitter) into 33-bit sub-blocks suitable for further processing. The deskew module 208 performs deskewing operations, such as lane alignment, and outputs a 66-bit encoded data block. The separator 210 divides the 66-bit encoded data block into 64 bits of encoded data and two bits of synchronization data. The descrambler 212 descrambles the 64 bits of encoded data, effectively reversing the scrambling done to the data by a scrambler in a transmitter. The 64B/66B decoder 214 is capable of receiving 64 bits of unscrambled encoded data and the two bits of synchronization data and decoding the encoded data. The 64B/66B decoder 214 outputs 72 bits of decoded data. Each of the components in the receiver 204 may include any hardware, software, firmware, or combination thereof for performing the appropriate functions.

The 72-bit outputs of the receivers 204 are stored in FIFO queues 216 in the FIFO block 116. The queues 216 could represent the same structures as the queues 118 of FIG. 1, or the queues 216 could represent structures that are separate from the queues 118.

In this example, each of the PCS modules 104a-104b also includes a 10GBase-X encoder 218. Each 10GBase-X encoder 218 is capable of encoding the decoded data produced by one of the receivers 204. For example, the 10GBase-X encoders 218 could encode the decoded data using 8B/10B encoding and then provide the encoded data to the serializers/deserializers 102a, which serialize the encoded data. Each of the encoders 218 includes any hardware, software, firmware, or combination thereof for encoding data. As shown in FIGS. 2A and 2B, each 10GBase-X encoder 218 includes multiple 8B/10B encoders 220, each of which encodes data in one of four lanes of the 10GBase-X encoder 218.

In this example embodiment, each receiver 204 receives 16-bit transfers of data and converts the 16-bit transfers into 33-bit sub-blocks. The sub-blocks are combined into 66-bit blocks of encoded data, which are processed to generate 72-bit values containing eight 8-bit payloads plus overhead. The 72-bit values are stored in the FIFO block 116, and 36-bit values are retrieved from the FIFO block 116 by each of the 10GBase-X encoders 218. The 36-bit values enter into four 9-bit lanes in the 10GBase-X encoders 218, and the encoders 220 encode the 9-bit values into 10-bit transmission characters suitable for transmission.

As noted above, FIGS. 1A through 2B illustrate the transmission and reception of an encoded data stream across multiple physical medium attachments. In this example embodiment, an encoded data stream is sent or received across two physical medium attachments. In other embodiments, an encoded data stream may be sent or received across N physical medium attachments (where N>1). As a specific example, where the encoded data stream is formed from 66-bit blocks, N could equal 2, 3, 6, 22, or 33.

By spreading the transmission or reception of 66-bit encoded data blocks among N physical medium attachments, serial clock signals used by the physical medium attachments could be reduced by a factor of N. For example, using two physical medium attachments, the serial clock signals used by the physical medium attachments could be reduced by a factor of two. This allows the device 100 to effectively transmit 66-bit blocks of encoded data, while components of the device 100 may operate at lower clock frequencies.

Figure 3:
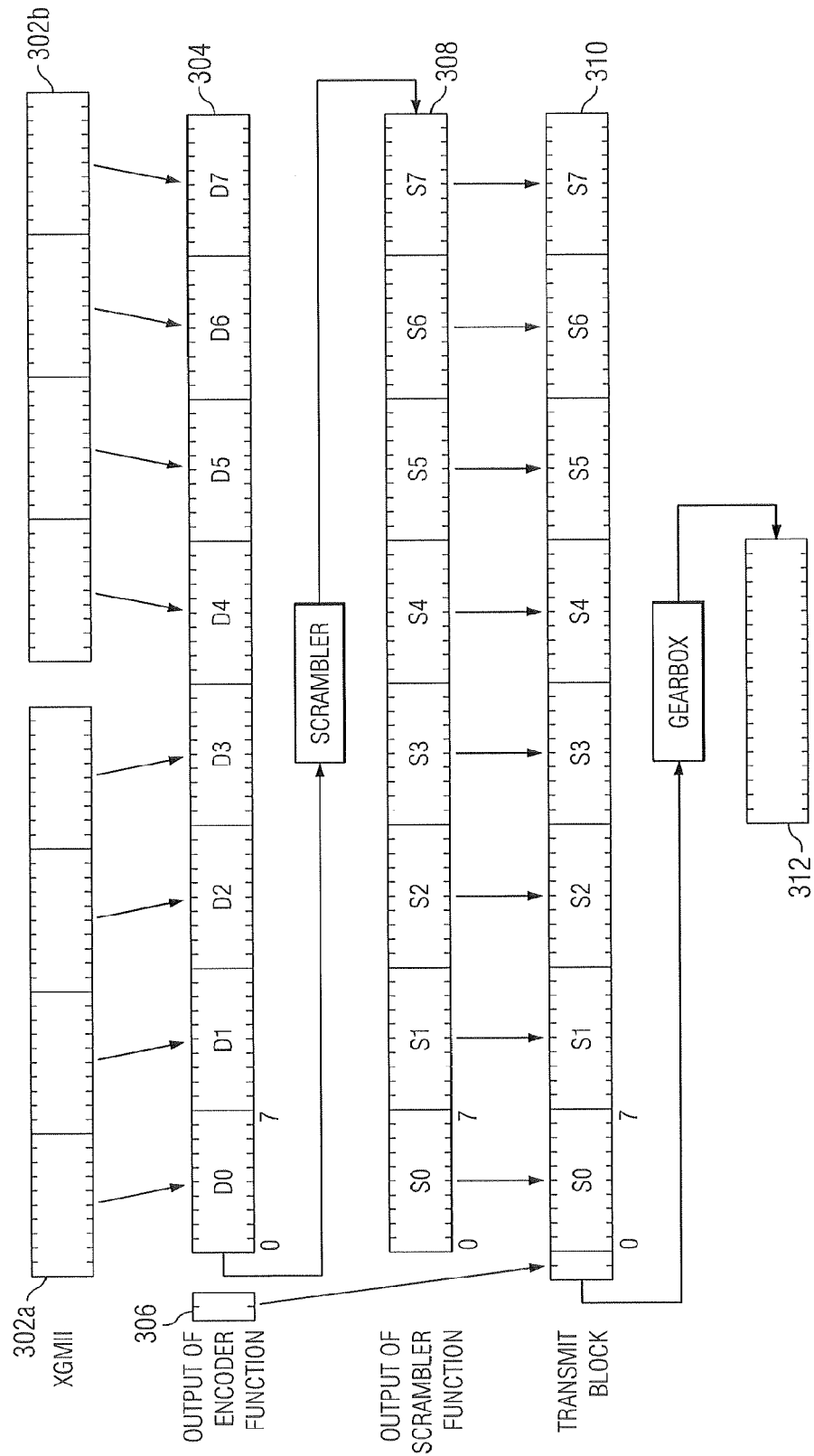
FIGS. 3 and 4 illustrate example bit ordering and re-ordering during transmission of an encoded data stream across multiple physical medium attachments according to one embodiment of this disclosure.
Figure 4:
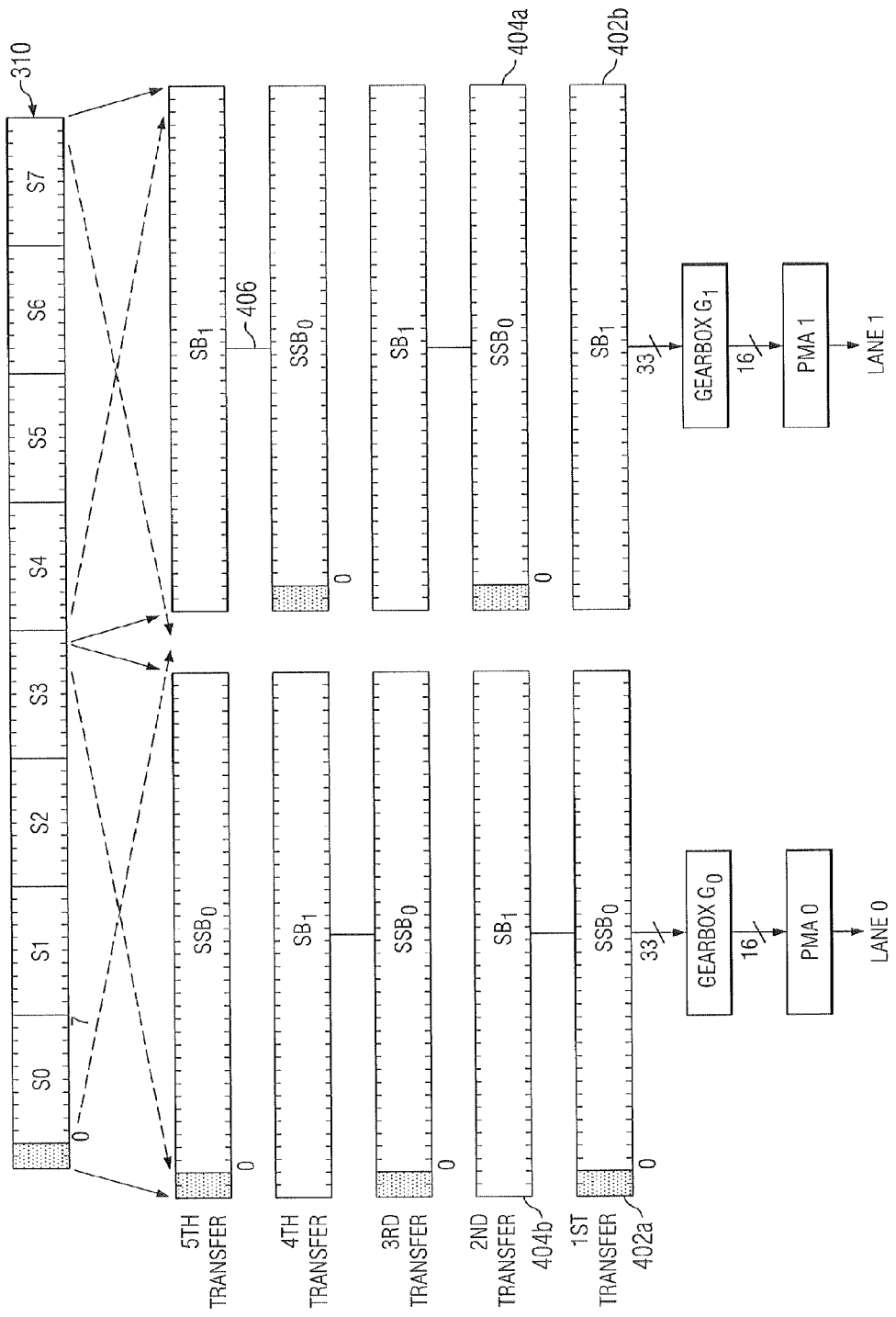

Additional details of how an encoded data block is transmitted across multiple physical medium attachments are provided in FIGS. 3 and 4. Additional details of how an encoded data block is received across multiple physical medium attachments are provided in FIGS. 5 and 6.

Although FIGS. 1 and 2 illustrate one example of a device 100 for transmitting and recovering encoded data streams across multiple physical medium attachments, various changes may be made to FIGS. 1 and 2. For example, FIGS. 1 and 2 illustrate the transmission and reception of an encoded data stream across two physical medium attachments (two of the serializers/deserializers 102b). Any other suitable number of physical medium attachments could be used in the device 100 to transmit or receive an encoded data stream. Also, while shown as having two PCS modules 104a-104b, two transmitters 122, and two receivers 204, the device 100 could include only one or more than two of these components. In addition, FIGS. 1 and 2 illustrate one example device 100 in which encoded data streams may be sent or received over multiple physical medium attachments. The mechanisms for sending and receiving encoded data streams over multiple physical medium attachments could be used in any other suitable device or system.

Although FIGS. 1A through 2B illustrate one example of a device 100 for transmitting and recovering encoded data streams across multiple physical medium attachments, various changes may be made to FIGS. 1A through 2B. For example, FIGS. 1A through 2B illustrate the transmission and reception of an encoded data stream across two physical medium attachments (two of the serializers/deserializers 102b). Any other suitable number of physical medium attachments could be used in the device 100 to transmit or receive an encoded data stream. Also, while shown as having two PCS modules 104a-104b, two transmitters 122, and two receivers 204, the device 100 could include only one or more than two of these components. In addition, FIGS. 1A through 2B illustrate one example device 100 in which encoded data streams may be sent or received over multiple physical medium attachments. The mechanisms for sending and receiving encoded data streams over multiple physical medium attachments could be used in any other suitable device or system.

FIG. 3 illustrates a bit ordering during transmission of an encoded data stream using conventional 64B/66B coding. In conventional encoders, a set of two 32-bit XGMII data values 302a-302b is received, and a 64B/66B encoder encodes the data values 302a-302b to produce a 64-bit data value 304 and a 2-bit synchronization header 306. In particular embodiments, the 2-bit synchronization header 306 contains either a binary "01" value (defining a data block) or a binary "10" value (defining a control block), depending on whether all bits in the original data values 302a-302b are data bits. A scrambler then scrambles the 64-bit data value 304 to produce a scrambled 64-bit data value 308. A combiner combines the scrambled 64-bit data value 308 and the 2-bit synchronization header 306 to produce a 66-bit encoded data block 310. In this example, the 2-bit synchronization header 306 is placed in the two least significant bit positions of the 66-bit block 310. The 66-bit block 310 is then provided to a single gearbox, which outputs a sequence of 16-bit data values 312 containing the 66-bit block 310.

In this example, the gearbox processes the 66-bit blocks 310 and adapts between the 66-bit width of the blocks 310 and the 16-bit width of a single physical medium attachment. The data values 302a-302b are sent at the XGMII TX_CLK rate of $f_{TX\_CLK}$, and the 16-bit values 312 are sent at a rate of:

$$f_{PMAWORD} = \frac{f_{TX\_CLK} \times 66}{16}. \quad (1)$$

As shown in FIG. 4, the 66-bit block 310 is split among two physical medium attachments (PMAs). In this example, each 66-bit block 310 is split into a pair of 33-bit sub-blocks, such as sub-blocks 402a-402b or 404a-404b. Each pair of 33-bit sub-blocks is then processed by two gearboxes (such as gearboxes 132 of FIG. 1). The gearboxes process the 33-bit sub-blocks to produce 16-bit data values at a rate of:

$$f_{PMAWORD,N=2} = \frac{f_{TX\_CLK} \times 66}{32}. \quad (2)$$

This can be generalized for all values of N, with a resulting 16-bit data value rate of:

$$f_{PMAWORD,N} = \frac{f_{TX\_CLK} \times 66}{16 \times N}. \quad (3)$$

The vertical lines 406 in FIG. 4 represent associations between different ones of the 33-bit sub-blocks in FIG. 4. In particular, each vertical line 406 links two sub-blocks that can be processed by a single gearbox as a 66-bit block. This may occur even though the two 33-bit sub-blocks are associated with different sets of data values 302a-302b.

The following description describes the general operation of the device 100. In the following description, the gearboxes are denoted $G_j$, where j=0 ... N−1. A total of N sub-blocks are sent to N gearboxes and are organized in such a way that a receiver of the 16-bit data values can achieve 66-bit block synchronization and can reconstruct the original 66-bit blocks.

In one technique, a 66-bit block is divided into a set of N sub-blocks, each sub-block containing 66/N bits (33-bit sub-blocks when N=2). In each set of sub-blocks, the first sub-block (denoted $SSB_0$ for "synchronization sub-block") contains the synchronization header, and the remaining sub-blocks (denoted $SB_1$ through $SB_{N-1}$) do not. Each of the sub-blocks is then provided to one of the N gearboxes. In particular embodiments, the sub-blocks are provided to the gearboxes in a rotating fashion. For example, for a first 66-bit block, the sub-blocks could be provided to the gearboxes in the following manner:

$SSB_0$ to $G_0$, $SB_1$ to $G_1$, ..., $SB_{N-1}$ to $G_{N-1}$.

For the second 66-bit value, the sub-blocks could be provided to the gearboxes in the following manner:

$SSB_0$ to $G_1$, $SB_1$ to $G_2$, ..., $SB_{N-1}$ to $G_0$.

In other words, the gearbox receiving the sub-block containing the synchronization header is shifted for each 66-bit block being processed in a round-robin fashion ($G_0$, then $G_1$, then $G_2$, etc.). In the case where N=2 as shown in FIG. 4, this technique means the synchronization headers in any two consecutive 66-bit blocks are processed by different gearboxes. In this technique, if transmit clocks used by the physical medium attachments are aligned and synchronous, this technique may not introduce any additional PMA-to-PMA skew in the transmission of an encoded data stream formed from the 66-bit blocks.

Although FIGS. 3 and 4 illustrate examples of bit ordering and re-ordering during transmission of an encoded data stream across multiple physical medium attachments, various changes may be made to FIGS. 3 and 4. For example, while FIGS. 3 and 4 illustrate the transmission of an encoded data stream across two physical medium attachments, any other suitable number of physical medium attachments could be used to transmit an encoded data stream.

Figure 5:
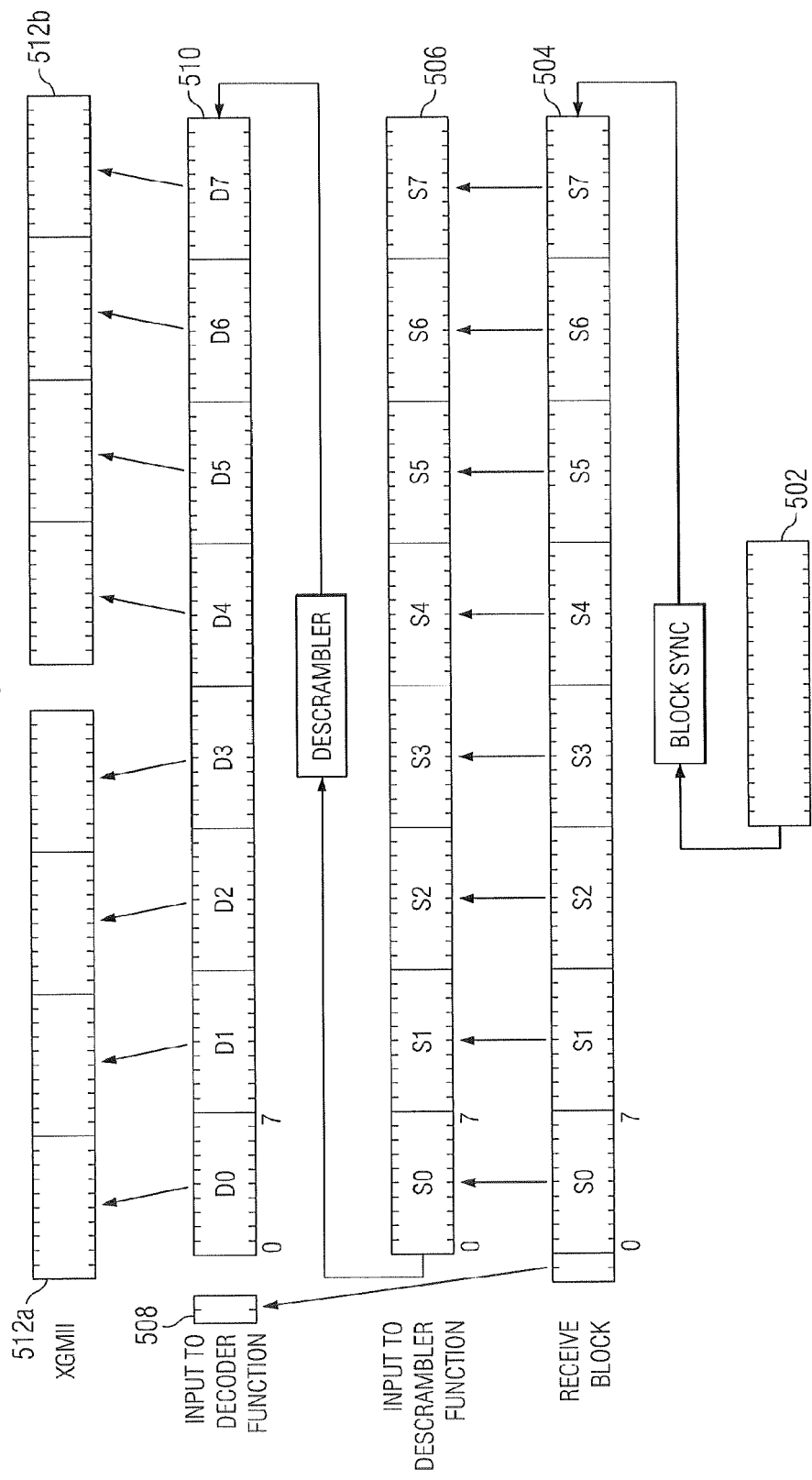
FIGS. 5 and 6 illustrate example bit ordering and re-ordering during reception of an encoded data stream across multiple physical medium attachments according to one embodiment of this disclosure.
Figure 6:
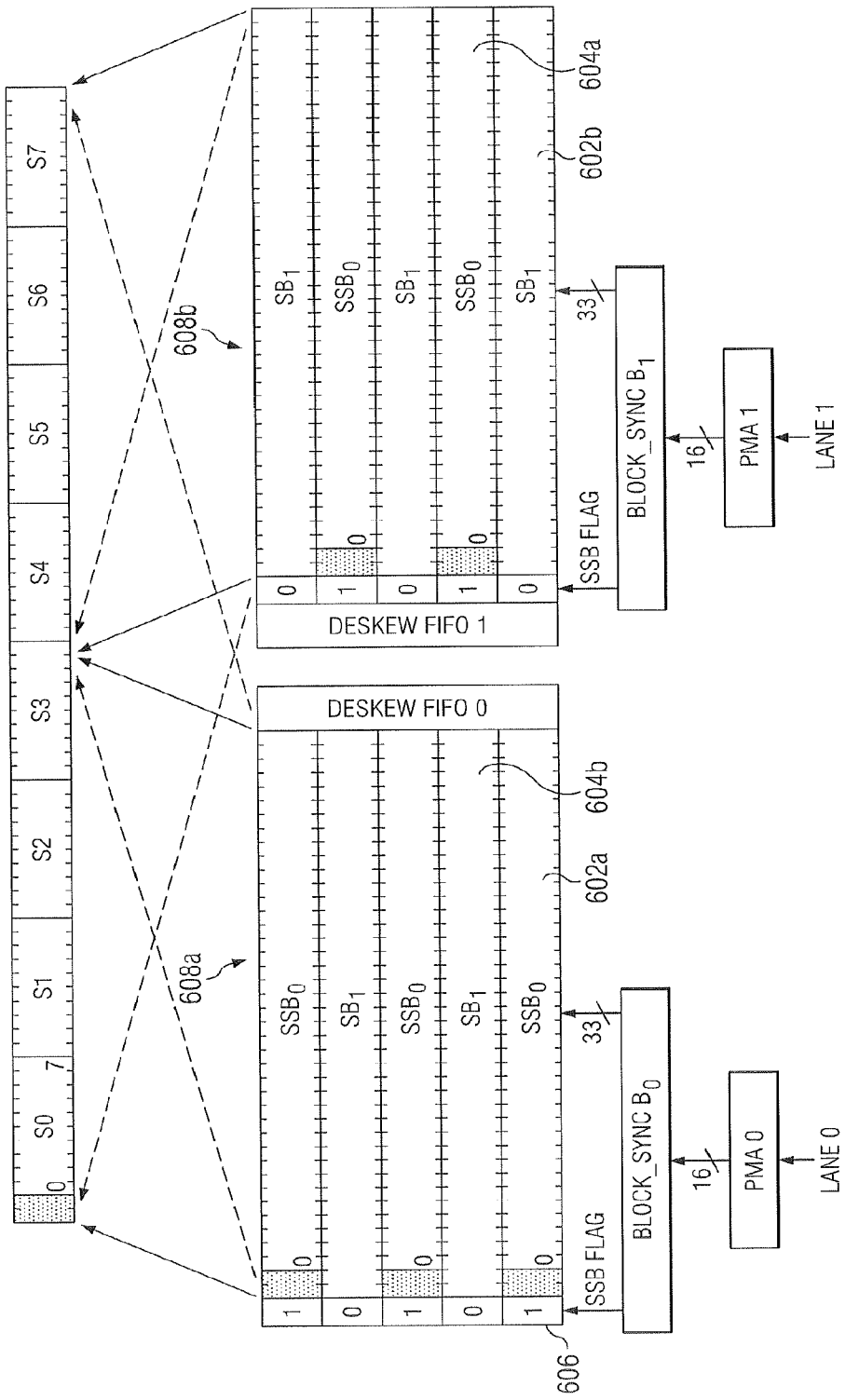

FIGS. 5 and 6 illustrate example bit ordering and re-ordering during reception of an encoded data stream across multiple physical medium attachments according to one embodiment of this disclosure. For ease of explanation, the bit ordering and re-ordering shown in FIGS. 5 and 6 are described with respect to the device 100 in FIGS. 2A and 2B. The bit ordering and re-ordering could be used with any other suitable device or system.

FIG. 5 illustrates a bit ordering during reception of an encoded data stream using conventional 64B/66B coding. In conventional decoders, 16-bit data values 502 are received at a block synchronization module, which converts the 16-bit data values 502 into 66-bit encoded data blocks 504. A separator divides each 66-bit block 504 into a 64-bit data value 506 and a 2-bit synchronization header 508. The 64-bit data value 506 is provided to a descrambler, which produces a 64-bit unscrambled data value 510. A decoder uses the 64-bit unscrambled data value 510 and the 2-bit synchronization header 508 to produce two 32-bit data values 512a-512b, which ideally represent the same 32-bit data values encoded by a transmitter.

In this example, the block synchronization module processes the 16-bit data values 502 and adapts between the 16-bit width of a single physical medium attachment and the 66-bit width of the blocks 504. The 16-bit values 502 may be received at a rate of:

$$f_{PMAWORD} = \frac{f_{RX\_CLK} \times 66}{16} \quad (4)$$

where $f_{RX\_CLK}$ is the XGMII RX_CLK rate. The block synchronization module also outputs the 66-bit blocks 504 at the XGMII RX_CLK rate (after obtaining a lock onto the 66-bit blocks 504 using the synchronization headers 508).

As shown in FIG. 6, two block synchronization modules (such as block synchronization modules 206 of FIG. 2) may receive the 16-bit values 502 from two physical medium attachments. The block synchronization modules could receive the 16-bit values at a rate of:

$$f_{PMAWORD} = \frac{f_{RX\_CLK} \times 66}{32}. \quad (5)$$

Each block synchronization module outputs 33-bit sub-blocks, such as sub-blocks 602a-602b and 604a-604b. The 33-bit sub-blocks may be output at the XGMII RX_CLK rate (after a lock is obtained). Each block synchronization module also outputs an SSB flag 606 that indicates whether an associated sub-block contains a synchronization header. The block synchronization module is capable of setting the flag 606 to the appropriate value since the block synchronization module locks onto the 66-bit blocks in the encoded data stream by detecting the synchronization headers.

While FIG. 6 illustrates the use of two physical medium attachments, this can be generalized to any number N of physical medium attachments. In the general case, the number of block synchronization modules is equal to N (one per PMA), and each block synchronization module receives 16-bit data values at a rate of:

$$f_{PMAWORD} = \frac{f_{RX\_CLK} \times 66}{16 \times N}. \quad (6)$$

The following description describes the general operation of the device 100. In the following description, the block synchronization modules are denoted $B_j$, where j=0 . . . N-1. A total of N sub-blocks are output by the N block synchronization modules after a lock is obtained. The mechanism used to produce the lock could, for example, include the block lock state machine shown in Clause 49 FIG. 49-12 of the IEEE 802.3 standard.

In an ideal case, there is no PMA-to-PMA (or lane-to-lane) skew present, and recovery of an original 66-bit block occurs using the SSB flags 606 from the block synchronization modules. In this ideal case, only one SSB flag 606 may be set (such as to a value of "1") for a given RX_CLK period. The set SSB flag 606 identifies the location at which reassembly of a 66-bit block begins. Reassembly may include a concatenation of the N 66/N-bit sub-blocks output from the N block synchronization modules to form one 66-bit block. As an example, if the SSB flag 606 for block synchronization module $B_j$ is set, a 66-bit block could be reassembled using (MSB to LSB):

$SSB_0$ from $B_j$, $SB_1$ from $B_{j+1}$, . . . , $SB_{N-1-j}$ from $B_{N-1}$, $SB_{N-j}$ from $B_0$, . . . , $SB_{N-1}$ from $B_{j-1}$.

In the situation where N=2, this results in an alternation of the two following 66-bit block transfers:

First 66-bit block: $SSB_0$ from $B_0$, $SB_1$ from $B_1$; and
Second 66-bit block: $SSB_0$ from $B_1$, $SB_1$ from $B_0$.

In a non-ideal situation, some amount of skew may be introduced by different elements, such as printed circuit board track lengths, transmit serialization, receive deserialization, and synchronization. In order to compensate for the skew and reconstruct the correct 66-bit blocks, deskewing FIFO queues 608a-608b are used, which are controlled by a deskewing finite state machine (in the deskew module 208) that works in conjunction with the descrambler 212. In some embodiments, the deskewing queues 608a-608b are operated at the RX_CLK rate, and each queue stores the received 33-bit sub-blocks and SSB flags 606 from a respective one of the block synchronization modules. Each queue also outputs one of its stored entries (a sub-block and its associated SSB flag 606) under the control of the deskewing state machine. In particular embodiments, each queue has a width of N+66/N and a depth that depends on the total system peak-to-peak skew $SK_{pk-pk}$, such as by:

ceil($N \times SK_{pk-pk}/66$) for N>2 ceil($N \times SK_{pk-pk}/132$) for N=2. (7)

Once the deskewing state machine has locked, the deskewing queues 608a-608b present aligned data from their outputs, and 66-bit block reconstruction can proceed as explained in the ideal case.

Although FIGS. 5 and 6 illustrate examples of bit ordering and re-ordering during reception of an encoded data stream across multiple physical medium attachments, various changes may be made to FIGS. 5 and 6. For example, while FIGS. 5 and 6 illustrate the reception of an encoded data stream across two physical medium attachments, any other suitable number of physical medium attachments could be used to receive an encoded data stream.

Figure 7:
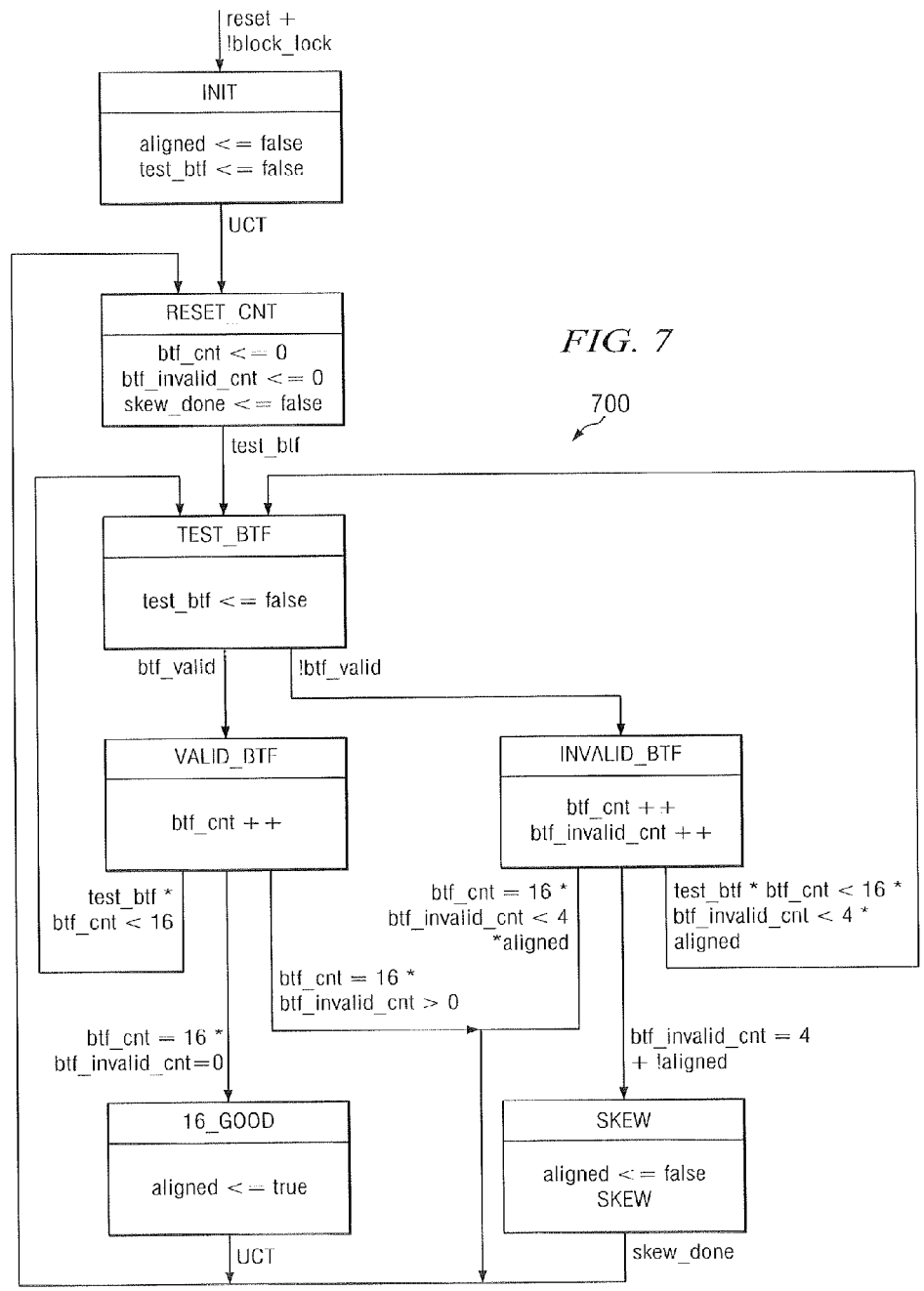
FIG. 7 illustrates an example deskewing finite state machine according to one embodiment of this disclosure.

FIG. 7 illustrates an example deskewing finite state machine 700 for use with an encoded data stream received across multiple physical medium attachments according to one embodiment of this disclosure. As noted above, the deskewing finite state machine 700 may be used to control the deskewing FIFO queues 608a-608b. In these embodiments, the deskewing finite state machine 700 is capable of realigning the sub-blocks produced by the block synchronization modules to allow correct reassembly of the 66-bit blocks.

In particular embodiments, the deskewing finite state machine 700 has inputs and outputs according to Table 1.

TABLE 1

| Signal | I/O | Size | Description |
| --- | --- | --- | --- |
| SSB_flag | Input | N | SSB flag vector as read from each deskewing FIFO output. |
| sync_header | Input | 2 × N | Sync header as read from each deskewing FIFO output |
| block_lock | Input | 1 | input vector indicating all N block_sync modules have achieved synchronization |
| btf | Input | 8 | Block type field byte output from descrambler |
| aligned | Output | 1 | alignment flag set when alignment has been achieved |
| deskew_pointer | Output | Log$_2$(depth) × N | Current deskewing FIFO read pointer |
| reset | Input | 1 | Finite state machine reset |

To achieve lane alignment, the deskewing state machine 700 may take advantage of some properties of the 64B/66B coding scheme, such as scrambling and the usage of predefined block type fields used when sending control blocks. The state machine 700 may start by assuming no lane deskewing is needed and setting deskewing queue pointers (which identify the desired entries in the queues 608a-608b) accordingly. Assuming only one SSB flag 606 is set for each 66-bit block, the state machine 700 reassembles the 66-bit blocks and passes them to the descrambler. Each time a control block is detected (such as by determining if the synchronization header has a binary value of "10"), the state machine 700 monitors the output of the descrambler for that particular control block to verify that the block type field (btf) represents one of the allowed field types.

In particular embodiments, the state machine 700 operates by assuming that the descrambling process produces a corrupted output whenever a 66-bit control block is assembled by concatenating sub-blocks not belonging to the same original 66-bit block, thereby causing the block type field to be corrupted. There might be the possibility that the corrupted block type field is still one of the allowed block type fields, leading the state machine 700 into error. The probability of making a mistake $P_{err}$ can be reduced or minimized by increasing the number M of block type field checks on received control blocks performed successfully before setting the aligned flag, such as:

$$P_{err} = \frac{14^M}{256} < 10^{-20} \text{ for } M > 16. \quad (8)$$

When an error occurs, the deskewing process may start over. For example, a deskew error flag may be set whenever multiple SSB flags 606 are set at the same time or the block type field of a received control block does not match one of the allowed block type fields. In particular embodiments, the deskewing finite state machine 700 can be derived from Clause 49 Figure 49-12 of the IEEE 802.3 standard by redefining some of the variables. For example, the state machine 700 shown in FIG. 7 may operate using the following variables, functions, and counters.

Variables block_lock: Boolean variable that is set to true when all N block synchronization modules acquire block delineation.

Reset: Boolean variable that controls the resetting of the 64B/66B PCS module 120. It is true whenever the finite state machine's reset input is set to 1, which occurs whenever a reset is necessary (including when a reset is initiated from a Management Data Input/Output or "MDIO", during power on, and when the MDIO has put the PCS module 120 into low-power mode).

btf_valid: Boolean variable that is set to true whenever the finite state machine's btf input belongs to one of the valid block type fields.

skew_done: Boolean variable that is asserted true when the SKEW function requested by the finite state machine has been completed, indicating that the next candidate deskew_ pointer setting can be tested.

test_btf: Boolean variable that is set to true when a new block type field is available for testing and false when a TEST_BTF state is entered. A new block type field is available for testing if:

sync_header<j>*SSB_flag<j>*!SSB_flag<i>$_{i=0, \ldots, N-1; i \neq j}$.

aligned: Boolean variable that is set to true when the finite state machine achieves alignment.

sync_header<j>: Boolean variable that is set to true when the synchronization header read from deskewing FIFO queue j is equal to a binary value of "10", which indicates that the current block is a control block.

SSB_flag<j>: Boolean variable that is set to true when the SSB flag read from deskewing FIFO queue j is set, which indicates that the sub-block read from FIFO queue j contains the synchronization header.

Functions

SKEW: Causes the next candidate deskew_pointer setting to be tested. The precise method for determining the next candidate deskew_pointer setting is implementation dependent and ensures that all possible deskew_pointer combinations are evaluated. The number of possible deskew_pointer combinations may be proportional to $(Nx-SK_{pk-pk})^N$.

Counters btf_cnt: Counts the number of block type fields checked within the current M block type field window.

btf_invalid_cnt: Counts the number of invalid block type fields within the current M block type field window.

Using these variables, function, and counters, the finite state machine 700 may operate as shown in FIG. 7 to control the operation of the deskewing FIFO queues 608a-608b.

Although FIG. 7 illustrates one example of a deskewing finite state machine 700 for use with an encoded data stream received across multiple physical medium attachments, various changes may be made to FIG. 7. For example, any other suitable state machine or other mechanism could be used to control the deskewing FIFO queues 608a-608b.

FIG. 8 illustrates an example method 800 for transmitting an encoded data stream across multiple physical medium attachments according to one embodiment of this disclosure. For ease of explanation, the method 800 of FIG. 8 is described with respect to the device 100 of FIGS. 1A and 1B. The method 800 could be used with any other suitable device or system.

The device 100 receives data to be transmitted at step 802. This may include, for example, receiving 8B/10B encoded data at the serializers/deserializers 102a and deserializing that encoded data. This may also include storing the deserialized data in the FIFO queues 106.

The device 100 decodes the received data at step 804. This may include, for example, a 10GBase-X decoder 108 retrieving the deserialized data from the FIFO queues 106. This may also include the synchronization modules 110, deskew modules 112, and 8B/10B decoders 114 operating on the deserialized data to decode the deserialized data.

The device 100 then encodes the decoded data at step 806. This may include, for example, the 10GBase-X decoder 108 storing the decoded data in the FIFO block 116. This may also include a 64B/66B aggregate transmitter 122 retrieving the data from the FIFO block 116 and the 64B/66B encoder 124 encoding the data. The device 100 scrambles the encoded data at step 808. This may include, for example, the scrambler 126 scrambling the encoded data in a specified or known pattern. The device 100 combines the scrambled data and synchronization data into a block at step 810. This may include, for example, the combiner 128 combining the scrambled data with synchronization data generated by the 64B/66B encoder 124 to produce an encoded data block.

The device 100 splits the encoded data block into multiple sub-blocks at step 812. This may include, for example, the demultiplexer 130 splitting a 66-bit encoded data block into N 66/N-bit sub-blocks. As a particular example, this may include the demultiplexer 130 splitting a 66-bit encoded data block into two 33-bit sub-blocks. The demultiplexer 130 could follow the pattern described above with respect to FIG. 4 regarding how the 33-bit sub-blocks are output. In particular, the demultiplexer 130 could switch which gearbox 132 receives a sub-block containing synchronization data.

The device 100 transmits the sub-blocks over different physical medium attachments at step 814. This may include, for example, the gearboxes 132 receiving the sub-blocks from the demultiplexer 130 and outputting 16-bit values. This may also include the gearboxes 132 adapting between the width of the sub-blocks and the width of the physical medium attachments. This may further include the serializers/deserializers 102b deserializing the 16-bit values for transmission.

Although FIG. 8 illustrates one example of a method 800 for transmitting an encoded data stream across multiple physical medium attachments, various changes may be made to FIG. 8. For example, the data received at step 802 could already represent decoded data, and step 804 could be omitted.

FIG. 9 illustrates an example method 900 for receiving an encoded data stream across multiple physical medium attachments according to one embodiment of this disclosure. For ease of explanation, the method 900 of FIG. 9 is described with respect to the device 100 in FIGS. 2A and 2B. The method 900 could be used with any other suitable device or system.

The device 100 receives sub-blocks containing encoded data over multiple physical medium attachments at step 902. This may include, for example, receiving sub-blocks containing 64B/66B encoded data at the serializers/deserializers 102b and deserializing that encoded data. This may also include storing the deserialized data in the FIFO queues 202. The sub-blocks could represent 33-bit sub-blocks received via 16-bit transfers.

The device 100 combines the sub-blocks to form a block, which contains encoded data and synchronization data, at step 904. This may include, for example, the block synchronization modules 206 outputting 33-bit sub-blocks and the deskewing module 208 outputting a 66-bit block.

The device 100 separates the encoded data and the synchronization data in the block of encoded data at step 906. This may include, for example, the separator 210 separating the 64 bits of encoded data from the two bits of synchronization data in the 66-bit block. The device 100 descrambles the encoded data at step 908. This may include, for example, the descrambler 212 reversing the scrambling performed by a scrambler in a transmitter of the encoded data. The device 100 decodes the unscrambled data using the synchronization data at step 910. This may include, for example, the 64B/66B decoder 214 decoding the 64 bits of encoded data using the two bits of synchronization data.

The device 100 then encodes the decoded data at step 912. This may include, for example, the 10GBase-X encoder 218 retrieving the decoded data from the FIFO block 116. This may also include the 8B/10B encoders 220 encoding the data using 8B/10B coding.

The device 100 transmits the encoded data to an appropriate destination at step 916. This may include, for example, the 10GBase-X encoder 218 providing the encoded data to the serializers/deserializers 102a. This may also include the serializers/deserializers 102a deserializing the encoded data and transmitting the data.

Although FIG. 9 illustrates one example of a method 900 for receiving an encoded data stream across multiple physical medium attachments, various changes may be made to FIG. 9. For example, the data transmitted at step 914 need not be recoded, and step 912 could be omitted.

FIG. 10 illustrates an example apparatus 1000 implementing the device of FIGS. 1A through 2B according to one embodiment of this disclosure. In this example, the apparatus 1000 represents a switch or router (referred to collectively as a "switching/routing apparatus") capable of facilitating the transfer of data between a local area network (LAN) and a wide area network (WAN).

In this example, the apparatus 1000 includes LAN ports 1002 coupling the apparatus 1000 to the local area network and WAN ports 1004 coupling the apparatus 1000 to the wide area network. Each of the ports 1002-1004 represents a structure capable of being coupled to a transmission medium, such as a connector capable of receiving an Ethernet cable.

The apparatus 1000 also includes a switch fabric 1006. The switch fabric 1006 is capable of routing information between various ones of the ports 1002 and/or 1004. For example, the switch fabric 1006 could receive data from a LAN port 1002 and route the data to another LAN port 1002 or to a WAN port 1004. The switch fabric 1006 could also receive data from a WAN port 1004 and route the data to a LAN port 1002 or to another WAN port 1004. The switch fabric 1006 includes any suitable structure for switching data.

As shown in FIG. 10, the device 100 of FIGS. 1A through 2B is used to transform data flowing between the local area network and the wide area network. In some embodiments, the local area network may operate using 8B/10B coding, and the wide area network may operate using 64B/66B coding. In this example, the device 100 operating as shown in FIGS. 1A and 1B converts 8B/10B encoded data received from the local area network into 64B/66B encoded data transmitted over the wide area network. Similarly, the device 100 operating as shown in FIGS. 2A and 2B converts 64B/66B encoded data received from the wide area network into 8B/10B encoded data transmitted over the local area network. Although not shown, a bypass mechanism could be provided that bypasses this conversion when the apparatus 1000 needs to route data from one WAN port 1004 to another WAN port 1004.

Although FIG. 10 illustrates one example of an apparatus 1000 implementing the device of FIGS. 1A through 2B, various changes may be made to FIG. 10. For example, FIG. 10 has been simplified for ease of illustration and explanation. The apparatus 1000 could include any additional components (such as components normally used in a switch or router) according to particular needs. Also, the device 100 could be used in any other router, switch, or other device or system.

In some embodiments, various coding or other functions described above may be implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. However, the various coding functions described above could be implemented using any other suitable logic (hardware, software, firmware, or a combination thereof).

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   generating encoded data blocks having respective synchronization headers;
   transmitting the encoded data blocks to a demulitplexer via a physical coding sublayer;
   based on a quantity of physical medium attachments, dividing, by the demultiplexer, the encoded data blocks into a plurality of respective sub-blocks each sized for separate transmission over one of a plurality of different physical medium attachments; and processing the sub-blocks with a plurality of gearboxes in an alternating fashion so that the synchronization headers from any two consecutive encoded data blocks are processed by different gearboxes, each gearbox comprising a plurality of outputs coupled to a respective one of the physical medium attachments.

2. The method of claim 1, wherein generating the encoded data blocks comprises:
encoding data using 64B/66B encoding to generate encoded data and synchronization data;
scrambling the encoded data; and
combining the scrambled encoded data and the synchronization data to generate a respective encoded data block.

3. The method of claim 2, further comprising:
receiving data encoded using 8B/10B encoding; and
decoding the received data, wherein the decoded data is encoded using 64B/66B encoding to generate the encoded data and the synchronization data.

4. The method of claim 1 further comprising:
receiving the plurality of sub-blocks over the plurality of physical medium attachments, wherein each of the plurality of sub-blocks is sized for separate transmission over one of the physical medium attachments and is received on a different one of the physical medium attachments
combining, using a multiplexer, the plurality of sub-blocks and generating respective encoded data block using the plurality of sub-blocks;
transmitting the encoded data block from the multiplexer via a physical coding sub layer; and
recovering data encoded in the encoded data block.

5. The method of claim 4, wherein recovering the data encoded in the encoded data block comprises:
separating scrambled encoded data and synchronization headers in respective encoded data blocks;
descrambling the encoded data; and
decoding the descrambled encoded data using 64B/66B decoding to recover the data.

6. The method of claim 4, wherein receiving the plurality of sub-blocks comprises:
receiving the plurality of sub-blocks from a plurality of block synchronization modules, each capable of receiving a plurality of inputs comprising one of the sub-blocks from one of the physical medium attachments.

7. The method of claim 6, further comprising:
storing the plurality of sub-blocks in a plurality of queues, each queue associated with one of the block synchronization modules; and
controlling the queues using a state machine such that the queues output aligned sub-blocks.

8. An apparatus comprising:
a transmitter comprising
a physical coding sublayer configured to provide data blocks having respective synchronization headers associated therewith,
a demultiplexer coupled to said physical coding sublayer and configured to divide the encoded data blocks into respective pluralities of separate sub-blocks,
a plurality of gearboxes configured to process the sub-blocks in an alternating fashion so that the synchronization headers from any two consecutive encoded data blocks are processed by different gearboxes, each gearbox comprising a plurality of outputs, and
a plurality of different physical medium attachments each coupled to the outputs of a respective gearbox.

9. The apparatus of claim 8 further comprising a receiver comprising:
a multiplexer configured to receive the plurality of sub-blocks over the plurality of physical medium attachments and combine the plurality of sub-blocks to generate respective encoded data blocks; and
a decoder to decode the encoded data blocks.

10. The apparatus of claim 9 wherein the decoder comprises a 64B/66B decoder.

11. The apparatus of claim 9 wherein the receiver further comprises:
a plurality of block synchronization modules coupled to respective multiplexers configured to re-construct the sub-blocks; and
a deskewing module configured to receive the sub-blocks from the block synchronization modules and output the encoded data blocks.

12. The apparatus of claim 8 wherein each physical medium attachment is configured to serialize data for transmission over a physical transmission medium.

13. A non-transitory computer-readable medium having computer-executable instructions for causing a transmitter to perform steps comprising:
generating encoded data blocks having a synchronization header;
transmitting the encoded data blocks to a demulitplexer via a physical coding sublayer;
based on a quantity of physical medium attachments, dividing the encoded data blocks into a plurality of respective sub-blocks each sized for separate transmission over one of a plurality of different physical medium attachments; and
processing the sub-blocks with a plurality of gearboxes in an alternating fashion so that the synchronization headers from any two consecutive encoded data blocks are processed by different gearboxes, each gearbox comprising a plurality of outputs coupled to a respective one of the physical medium attachments.

14. The non-transitory computer-readable medium of claim 13 wherein generating the encoded data blocks comprises:
encoding data using 64B/66B encoding to generate encoded data and synchronization data;
scrambling the encoded data; and
combining the scrambled encoded data and the synchronization data to generate the encoded data blocks.

* * * * *